March 25, 1969 A. BLOCK ET AL Re. 26,552

ABRASIVE DEVICE

Original Filed July 1, 1963 Sheet 1 of 2

INVENTORS:
Aleck Block
Joseph W. Purcell, Jr.
By Smyth, Roston & Pavitt
ATTORNEYS

ABRASIVE DEVICE

Original Filed July 1, 1963

INVENTORS:
Aleck Block
Joseph W. Purcell, Jr.
By Smyth, Roston & Pavitt
ATTORNEYS United States Patent Office Re. 26,552
Reissued Mar. 25, 1969

26,552
ABRASIVE DEVICE

Aleck Block, Los Angeles, and Joseph W. Purcell, El Monte, Calif., assignors to Merit Products, Inc., Los Angeles, Calif., a corporation of California Original No. 3,270,468, dated Sept. 6, 1966, Ser. No. 291,830, July 1, 1963. Application for reissue June 26, 1967, Ser. No. 661,137
Int. Cl. B24d *17/00;* B24b *45/00*
U.S. Cl. 51—358 34 Claims

Matter enclosed in heavy brackets [ ] appears in the original patent but forms no part of this reissue specification; matter printed in italics indicates the additions made by reissue.

*ABSTRACT OF THE DISCLOSURE*

*This invention relates to a power-driven abrasive device having a driving member and a driven member which may be an abrasive disk. The driving member has a non-circular socket which mates with a non-circular socket on the driven member. Cooperating shoulders are provided in the non-circular sockets of the driving member and the driven member for mutual releasable engagement in response to rotation of the driven member from a first rotary position to a second rotary position relative to the driving member. Such an arrangement makes it a simple matter to orient the replaceable driven member at the first rotary position relative to the driving member and then insert the driving member into the driven member and rotate the driven member to its binding position.*

This invention relates to a power-driven abrasive device and, more particularly, relates to such a device in which flexible abrasive disks are replaceably mounted on a rotary drive member, for example, a drive shaft.

The abrasive disks are commonly in the form of fabric coated with abrasive particles, with the disk backed by a corresponding elastomeric member of suitable flexibility. Since the abrasive disks are used up rather quickly, the abrasive disks are replaced frequently. For economy in employing such disks in fabrication procedures, it is essential that the labor cost be minimized by making the disks replaceable on the rotary drive member in a rapid and convenient manner.

For this purpose, two cooperating means must be provided on the drive member and on the abrasive disk respectively, adapted for interlocking with each other quickly and efficiently. It is important that the interlocking engagement have two functions. One function is to releasably engage the disk with the rotary drive member in a manner to prevent relative rotation between the abrasive disk and the drive member, so that the drive member will drive the abrasive disk in a positive manner. The other function is to releasably engage the abrasive disk with the drive member in a manner for positive prevention of axial separation of the disk from the drive member.

It is apparent that economy in cost of materials is also desirable. For this reason, the flexible elastomeric disk that backs the abrasive disk is commonly separate from the abrasive disk and permanently mounted on the rotary drive member to avoid unnecessary replacement of the elastomeric disk. It follows that the minimum replaceable structure comprises simply the abrasive disk itself, together with coupling means integral therewith for cooperation with complementary coupling means carried by the drive member. It is apparent that the basic problem is to provide a construction in which the cooperating coupling means on the abrasive disk is efficient but is of minimum cost, since this cooperating means is discarded with the disk.

In general, the present invention meets the requirements of this situation by providing a noncircular socket member for mounting on the drive member and by providing a cooperating inexpensive, noncircular hub structure integral with the abrasive disk, with the hub structure shaped and dimensioned to fit loosely in the socket at a first rotary position of the hub structure relative to the socket and to bind against the peripheral wall of the socket at a second relative rotary position for rotary actuation of the drive disk. To prevent axial separation of the hub structure from the socket structure, the invention further provides cooperating shoulders on the two structures respectively for mutual releasable engagement in response to rotation of the hub structure from its first rotary position to its second rotary position relative to the socket structure. Such an arrangement makes it a simple matter to orient the replaceable abrasive disk at the first relative rotary position of the hub structure thereon and then insert the hub structure into the socket structure and rotate the hub structure to is binding position.

In all of the practices of the invention disclosed herein, the socket formed by the socket structure is provided with an axial boss which results in the socket having an annual configuration. This boss, centrally located in the socket, is provided with a peripheral shoulder that faces axially inward of the socket. Cooperating shoulder means on the hub structure that is carried by the abrasive disk engages this peripheral shoulder in response to rotation of the hub structure in the socket from its first rotary to its second rotary position.

As will be explained, a feature of some practices of the invention is that the shoulder means carried by the hub structure on the abrasive disk is flexed radially inward with a wedging or camming action in response to relative rotation of the hub structure from its first rotary position to its second rotary position. With the arrangement such that the resistance to rotation on the part of the abrasive disk relative to the drive member, created by the friction of the abrasive disk against a workpiece, is in the direction to rotate the hub structure from its first position to its second position, the wedging or camming action causes the engaging pressure between the two cooperating shoulders to increase in response to the torque load.

A feature of a further practice of the invention disclosed herein is the concept of employing magnet means to hold the abrasive disk on the drive member at the first or release position of the hub structure relative to the socket structure, the magnetic force involved being adequate to support the weight of the abrasive disk with the hub structure thereon. When the hub structure on the abrasive disk is initially inserted into the socket at the release position of the hub structure, the magnetic force holds the hub structure against axial withdrawal in a light, yielding manner until the abrasive disk is rotated to its locking position. Thus, the provision of the magnet means makes it unnecessary for the operator to take the trouble to rotate the newly installed abrasive disk to its locking position, since initial contact of the abrasive disk with a workpiece causes the abrasive disk to be rotated automatically to its locked position.

The features and advantages of the invention may be understood from the following detailed description and the accompanying drawings.

In the drawings, which are to be regarded as merely illustrative:

Figure 2:
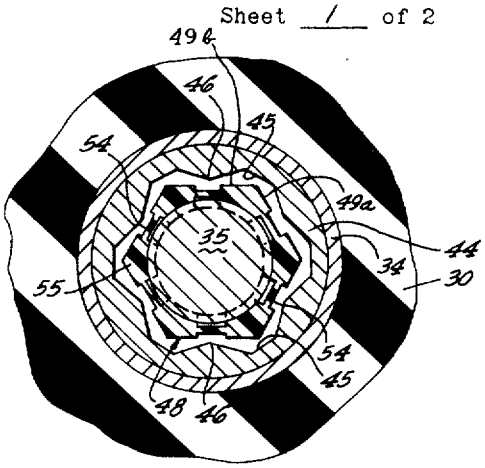
FIG. 2 is a sectional view taken along the line 2—2 of FIG. 1, showing the hub structure at its release position, i.e., its first rotary position relative to the surrounding socket structure.
Figure 4:
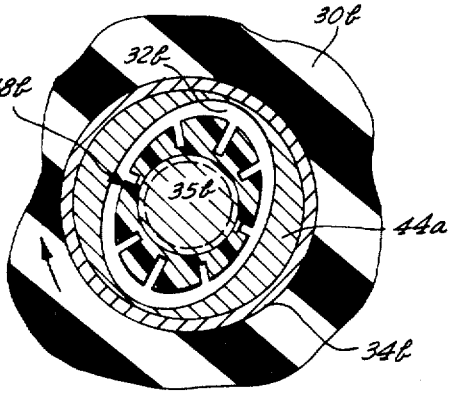
Figure 3:
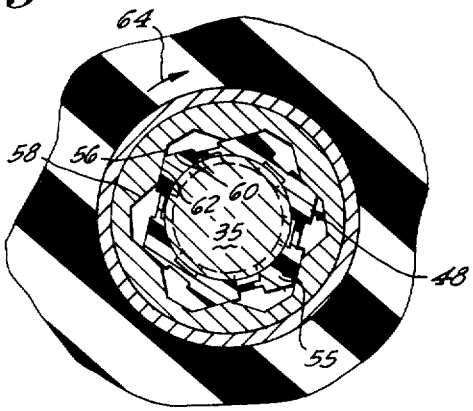
Figure 3A:
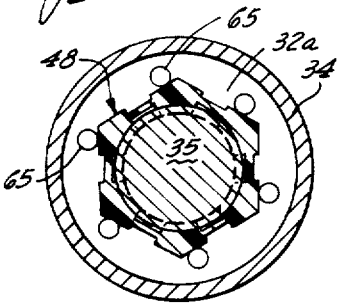
Figure 5:
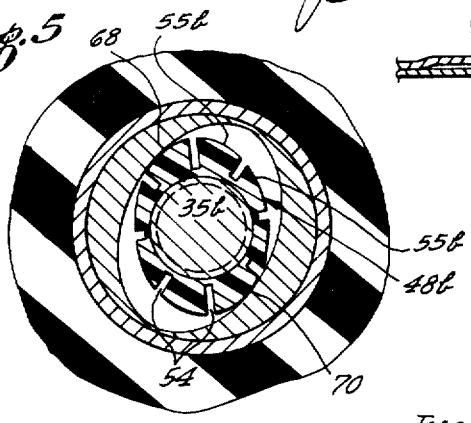
Figure 6:
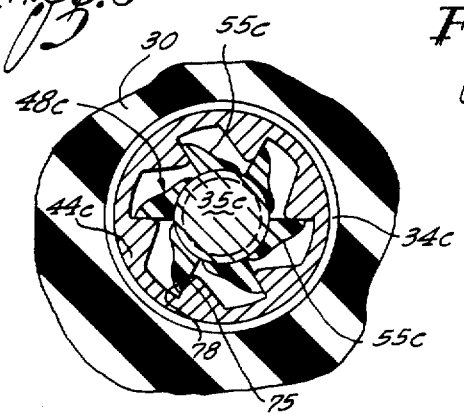
Figure 7:
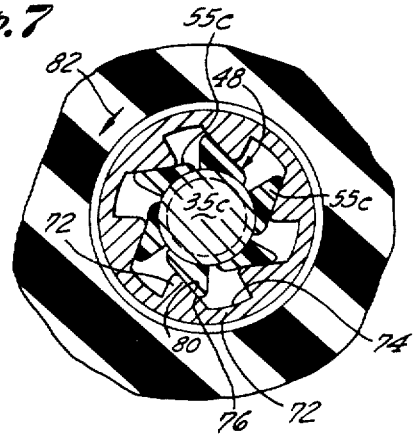
Figure 8:
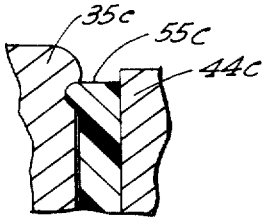
Figure 9:
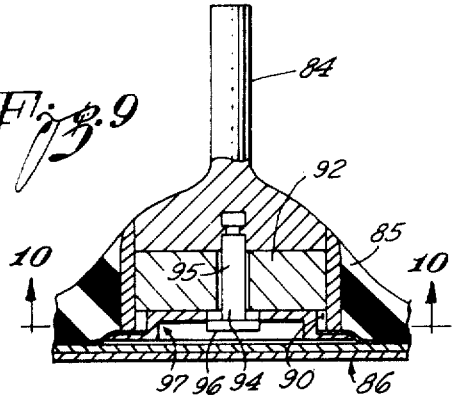
Figure 10:
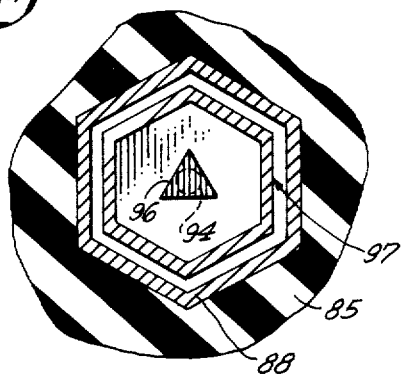
Figure 11:
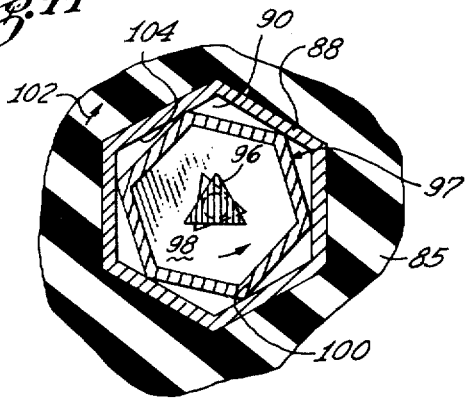

FIG. 3 is a similar view, showing the hub structure rotated to its second locking position at which the outer noncircular peripheral wall of the hub structure binds against the inner peripheral wall of the socket structure to prevent relative rotation between the two structures; and, in addition, shoulder means on the two structures engage each other to prevent axial separation of the two structures;

FIG. 3a is a view similar to FIG. 3 of an embodiment of the invention in which the socket structure of the first embodiment is replaced by a circular socket structure which incorporates a plurality of pins that, in effect, convert the circular configuration to noncircular, configuration;

FIG. 4 is a sectional view similar to FIG. 2, in which the socket structure and the hub structure are both oval, the view showing the hub structure at its release position relative to the socket structure;

FIG. 5 is a view similar to FIG. 4, showing the hub structure rotated to its locking position;

FIG. 6 is a sectional view similar to FIGS. 2 and 4, showing a third embodiment of the invention with the hub structure at its release position relative to the socket structure;

FIG. 7 is a similar veiw showing the hub structure at its locking position;

FIG. 8 is a similar view showing the hub structure at an intermediate position;

FIG. 9 is a diametrical sectional view of another embodiment of the invention which incorporates a permanent magnet;

FIG. 10 is a sectional view taken along the line 10—10 of FIG. 9, showing the hub structure in its release position; and FIG. 11 is a similar view showing the hub structure rotated to its locking position.

Figure 1:
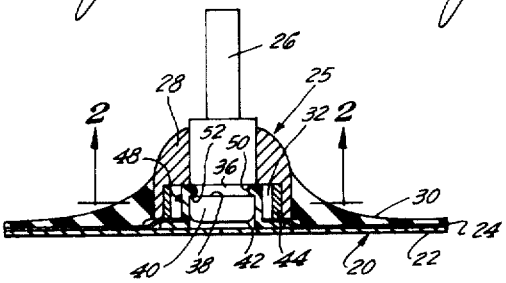
FIG. 1 is a diametrical sectional view of a first embodiment of the invention, showing an abrasive disk with its unitary hub structure releasably engaged with a complementary socket structure that is adapted for mounting on a rotary drive member.

Referring to FIG. 1, the first embodiment of the invention includes an abrasive disk, generally designated 20, which is made in two layers, namely, an outer fabric layer 22 with suitable abrasive particles bonded to the face thereof and an inner backing layer of suitable material such as fiberboard bonded to the fabric in a unitary manner.

For the purpose of mounting the abrasive disk 20 on a power-driven member (not shown) in a quickly releasable manner, the invention provides what may be a socket structure, generally designated 25, which is suitably adapted for mounting on the drive member In the construction shown, the socket structure 25 has a shank 26 for insertion into a chuck or other connecting mechanism on the driven member.

The socket structure 25 includes a circular body 28, on which is permanently mounted an elastomeric flange 30 of tapered cross section, as shown, which functions as the required flexible backing disk for the abrasive disk 20. The circular body 28 forms a socket 32 defined by a circumferential wall 34, and a suitable boss is provided in the center of the socket to give the socket [to give the socket] an annular configuration. In the construction shown, a boss 35 for this purpose is [integraly] *integrally* with the shank 26 and is provided with a circumferential groove 36 which forms a peripheral shoulder 38 that is close to the bottom of the socket and faces axially inward of the socket. Preferably, the boss 40 is formed with a rounded and tapered rim 42 to [faciliiate] *facilitate* mating of the parts.

It is important to note that a sleeve or liner 44 is mounted in the socket 32 snug against the circumferential wall 34 of the socket to give the socket a noncircular configuration. In the construction shown, the noncircular configuration of the socket 32 may be aptly termed of generally hexagonal configuration, since it is characterized by six peripheral recesses 45 of equal circumferential spacing. The recesses 45 may be regarded as being formed by six radially inward projections 46 having tapered shoulders.

Mounted on the back of the abrasive disk 20 and firmly united therewith is a hub structure, generally designated 48, of general annular configuration, with an inner circumference dimensioned for a snug sliding fit over the boss 40. In the construction shown, the hub structure 48 is a resilient plastic member, for example, a member made of nylon, which is noncircular in external configuration. In this instance, the external configuration is that of a hexagon. The plastic member is provided near its outer end with a radially inward flange or lip 50 which forms a circumferential shoulder 52 and which is adapted to engage and interlock with the previously mentioned peripheral shoulder 38 of the boss 40. It is contemplated that when the hub structure 48 is forced onto the boss 40, the inner circumferential shoulder 52 of the hub structure will snap into engagement with the peripheral shoulder 38 of the boss.

Figure 1A:
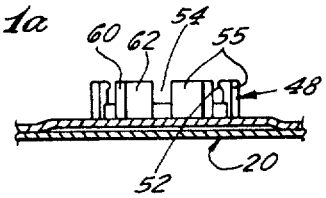
FIG. 1a is a fragmentary view of the abrasive disk in FIG. 1, showing the hub structure of the abrasive disk in side elevation.

To carry out this concept, the hub structure 48 must be radially flexible to the required degree. For this purpose, the hub structure is provided with six slots 54 (FIG. 1a) centrally located on each of the six faces of the hexagon, the slots extending inward from the rim of the hub member any desired distance. Thus, the slots 54 divide the hub structure into six segments or fingers 55, each of which is externally tapered *or relieved or radially inclined* in both circumferential directions *to define a pair of opposite sides such as 49a and 49b*, as shown.

It is apparent that each of the six radially inward *or inclined* projections 46 in the circumferential wall of the socket 32 has two oppositely inclined shoulders 56 and 58 and that each of the six fingers 55 also has two oppositely inclined shoulders 60 and 62.

FIG. 2 shows the hub structure 48 at what is termed its first rotary position relative to the surrounding socket structure 25, this relative position being the release position at which the socket structure may freely enter the socket structure or freely withdraw from the socket structure. With the hub structure "bottomed" in the socket structure, i.e., with the rim of the hub structure abutting the bottom wall of the socket, and with the radial inward flange 50 of the hub structure seated in the circumferential grove 36 of the boss 40 with the shoulder 52 of the hub structure in engagement with the peripheral shoulder 38 of the boss, the hub structure is rotatable between the first release position shown in FIG. 2 and the second locking position shown in FIG. 3.

In FIG. 3, it is assumed that the socket structure is power driven clockwise, as indicated by the arrow 64, and that the hub structure 48 opposes this rotation because of its inertia and because of frictional contact of the abrasive disk 20 with a workpiece. Consequently, each of the shoulders 56 of the six projections 46 abuts a corresponding shoulder 62 of a corresponding finger 55 of the hub structure 48. Thus, the socket structure makes contact with six equally spaced regions of the hub structure for the purpose of rotatably driving the abrasive disk 20.

It can be seen in FIG. 3 that the inclination of the two abutting shoulders 56 and 62 relative to a concentric circle or a tangent to the concentric circle is such that the driving force applied to the hub structure has two components, one component being tangential in the direction of rotation and the other component being radially inward towards the axis of rotation. Thus, there is a certain wedging action in which each of the projections 46 tends to cam the corresponding cooperating flexible finger 55 radially inward. In effect, a substantial portion of each of the hub structure fingers 55 is trapped radially between the surface of the inner boss 35 and the surface of the surrounding wall of the socket 32. It is apparent that under these dynamic conditions the hub structure 48 is positively interlocked with the socket structure 25 because each of the six fingers 55 is confined against the boss 35 in a positive manner to prevent disengagement of the hub structure shoulder 52 from the socket structure shoulder 38. Because of this wedging or camming action, the radially inward component of the driving force actually increases with the increase in the load, i.e., increases with the resistance to rotation on the part of the abrasive disk 20.

It is apparent from this description of the first embodiment of the invention that it is a simple matter to install an abrasive disk 20 on the power-driven socket structure 25. With the hub structure oriented at its first position relative to the socket structure as shown in FIG. 2, the abrasive disk is moved axially inward to introduce the hub structure into the socket. The abrasive disk may then be rotated slightly counterclockwise, as viewed in FIG. 3, to bring the six inclined shoulders 62 of the hub structure 48 into abutment with the six shoulders 56 of the socket structure. As long as the abrasive disk is power driven, the hub structure remains positively interlocked with the socket structure to cause the abrasive disk to rotate with the socket structure, and at the same time the hub structure remains positively interlocked with the boss 35 to prevent axial withdrawal of the hub structure from the socket.

In the modification of the invention indicated by FIG. 3a, the sleeve or liner 44 of the first embodiment of the invention is omitted and is replaced by six equally spaced longitudinal pins 65. Thus, the resulting socket 32a is difined by the cylindrical circumferential wall 34 and the six pins 65. The six pins 65 cooperate with the cylindrical wall to provide a noncircular socket configuration with six shoulders, the pins 65 being equivalent to the radially inward projections 46 of FIGS. 2 and 3. It is apparent that the six pins 65 cooperate with the six fingers 55 of the hub structure in the same manner as the six shoulders 56 of the first described embodiment of the invention.

FIGS. 4 and 5 illustrate another embodiment of the invention which differs from the first described embodiment essentially in that the noncircular configuration of the socket and the noncircular configuration of the hub structure are both generally oval rather than generally hexagonal. The structure of the second embodiment of the invention is largely identical with the structure of the first embodiment, as indicated by the use of corresponding numerals to indicate corresponding parts. Thus, the socket structure has the usual cylindrical circumferential wall 34b with an elastomeric flange 30b extending radially therefrom. In addition, the socket is provided with the usual axial boss 35b of the previously described configuration.

A sleeve or liner 44a permanently installed inside the cylindrical wall 34b forms a socket 32b of oval configuration. The cooperating hub structure, generally designated 48b, that is integral with the abrasive disk is also of elongated or oval outside configuration but is of circular inside configuration with an internal diameter required for snug fit over the boss 35b. Here again, the hub structure 48b may comprise a single piece of nylon bonded to the back of the abrasive disk. Here again, the hub structure is divided into a plurality of segments or flexible fingers 55b by a plurality of radial slots 54. Since the socket 32b and the hub structure 48b are of elliptical configuration with major and minor axes, they can be considered as defining projections in view of their noncircular configuration.

FIG. 4 shows the first or release position of the hub structure 48b relative to the surrounding socket structure. At this position, the longitudinal axes of the two oval configurations substantially coincide. FIG. 5 shows the hub structure 48b rotated counterclockwise relative to the socket structure to its second position to cause a binding action across a diameter of the assembly. Thus, a portion 68 of the peripheral surface of the socket abuts and cams inward one of the hub structure fingers 55b, and a diametrically opposite portion 70 of the peripheral wall of the socket abuts and cams inward a second finger. It is apparent that this embodiment of the invention functions in substantially the same manner as the [firs] *first* described embodiment.

In the embodiments of the invention described up to this point, it is apparent that with the abrasive disk in interlocked driving engagement with the cooperating socket structure, the disk is one limit rotary position relative to the socket structure and may be rotated a few degrees to an opposite rotary limit position at which the same locking action occurs. Consequently, to remove a worn abrasive disk from the socket structure, the abrasive disk must first be counterrotated to an intermediate position approximately half way between its two limit positions. In the embodiment of the invention shown in FIGS. 6, 7, and 8, however, the abrasive disk may be released from interlocking driving engagement with the socket structure by simply counterrotating the disk to its second limit position.

In FIGS. 6, 7, and 8, the construction is largely similar to the previously described construction, as indicated by the use of corresponding numerals to indicate corresponding parts. Here again, the socket has a circumferential cylindrical wall 34c and is provided with the usual axial boss 35c with a circumferential groove 36c of the configuration heretofore described. In this instance, however, the socket is provided with a sleeve or liner 44c which is of cylindrical configuration with six equally spaced radially inward triangular projections or teeth 72 which form six equally spaced peripheral recesses 74. Each of the radially inward projections 72 has a substantially radial stop face 75 and an opposite inclined cam face or shoulder 76.

The hub structure, generally designated 48c, for snap-on engagement with the socket structure shown in FIGS. 6, 7, and 8, is in the form of a plastic member, preferably nylon, having six slots which divide the hub structure into six flexible fingers 55c. As best shown in FIG. 8, each of the fingers 55c has a substantially radial stop face 78 and an oppositely directed inclined shoulder or cam face 80. In addition, each flexible finger 55c has an inward radial flange or lip 81 to engage the peripheral shoulder formed by the circumferential groove 36c. FIG. 6 shows the hub structure at what may be termed its release rotary position or first limit rotary position, at which the stop faces 78 of the fingers 55c abut the stop faces 75 of the corresponding projections 72. At this orientation of the abrasive disk relative to the socket structure, the hub structure 48 of the abrasive disk may freely pass into and out of the socket of the socket structure. FIG. 7 shows the hub structure 48c turned to its second rotary limit position in interlocking driving engagement with the socket structure.

With the socket structure rotating clockwise, as indicated by the arrow 82, the cam shoulders 76 of the six radially inward projections 72 press against the cooperating cam shoulders 80 of the fingers 55c. Here again, the driving force transmitted to the hub structure by the socket structure has both a circumferential component and a radially inward component, the radially inward component forcibly holding the fingers 55c against the boss 35c, with the cooperating shoulders of the fingers and the boss interlocking to hold the hub structure against axial withdrawal from the socket. It is apparent that the abrasive disk may be oriented for free withdrawal from the socket structure by simply reversely rotating the abrasive disk from the limit position indicated in FIG. 7 to the opposite limit position indicated in FIG. 6.

One advantage of this embodiment resides in the fact that whenever driving rotation of the power actuated socket structure is stopped, the inertia of the abrasive disk causes the abrasive disk to rotate to its release position shown in FIG. 6, and if the abrasive disk is worn out, it may be removed without any preliminary manipulation. When power actuation is resumed, the abrasive disk automatically lags by inertia to return to its locked position. Thus, this embodiment provides a snap-on engagement means which functions like a detent to retain the abrasive disk at the release position of the disk.

In the last embodiment of the invention, shown in FIGS. 9 to 11, the socket structure has the usual shank 84 and carries the usual elastomeric flange 85 to back up a replaceable abrasive disk that is generally designated 86. The socket structure has a circumferential wall 88 of hexagonal configuration which defines a hexagonal socket 90. In this instance, the bottom of the socket 90 is formed by a permanent magnet 92 in the form of a heavy disk. The usual axial boss 94 is formed in the socket by a suitable fixed pin 95 (FIG. 9) that extends through the permanent magnet and has a flange or head 96 of noncircular configuration. In the construction shown, the flange or head 96 is of triangular configuration, as may be seen in FIGS. 10 and 11.

The cooperating hub structure, generally designated 97, for the abrasive disk 86 is a sheet metal stamping with a flat transverse end wall 98 that is adapted to lie flat against the magnet 92 when the abrasive disk is mounted on the hub structure. The sheet metal stamping has a peripheral wall 100 of the configuration of a hexagon of lesser diameter than the hexagon defined by the socket 90.

FIG. 10 shows the hub structure 97 at its first or release rotary position relative to the surrounding socket structure. At this position, the two hexagonal configurations are symmetrical relative to each other. FIG. 11 shows how the socket structure engages the hub structure to drive the disk in a clockwise direction indicated by the arrow 102. It can be seen in FIG. 11 that each of the six inner circumferential faces 104 of the hexagonal socket abuts one of the six corners 105 of the hub structure 97.

To complete the requirement for effectively interlocking the abrasive disk 86 with the socket structure, the end wall 98 of the hub structure is formed with a triangular aperture 106 that closely conforms with the triangular configuration of the flange or head 96 of the boss 94 and is dimensioned to clear the boss. When the end wall 98 of the hub structure lies against the face of the permanent magnet 92, as shown in FIG. 9, the end wall 98 of the hub structure is behind the plane of the flange or head 96. It is apparent [tht] *that* when the hub structure is inserted into the socket structure with the parts oriented relative to each other, as shown in FIG. 10, the triangular aperture 106 of the hub structure freely passes over the triangular flange or head 96; and when the hub structure is then rotated relative to the socket structure to the position shown in FIG. 11, the end wall 98 of the hub structure effectively engages the triangular flange or head 96 to lock the hub structure against axial withdrawal from the socket. Thus, the cooperating shoulders provided by the end wall aperture 106 and the triangular flange or head 96 interlock in response to the rotation of the hub structure from the first position shown in FIG. 10 to the second position shown in FIG. 11.

The function of the permanent magnet is to lightly retain the abrasive disk on the hub structure when the parts are in the release position shown in FIG. 10. Thus, when the operator inserts the hub structure into the socket with the hub structure at the orientation shown in FIG. 10, it is not then necessary for the operator to rotate the abrasive disk slightly to mechanically interlock the abrasive disk with the socket structure. As soon as the newly installed abrasive disk at the orientation indicated in FIG. 10 is applied to a workpiece, the resulting frictional load causes the hub structure to rotate automatically to the locking position shown in FIG. 11.

Our description in specific detail of the selected embodiments of the invention will suggest various changes, substitutions, and other departures from our disclosure within the spirit and scope of the appended claims.

We claim:

1. In an apparatus of the character described, means for mounting an abrasive disk on a rotary drive member, comprising:

structure on the drive member *having an inner surface* forming a noncircular *socket* extending peripherally around the drive member socket;

a noncircular hub structure united with the abrasive disk and dimensioned to fit loosely in the socket at a first rotary position of the hub structure relative to the socket and to bind against the inner surface of the socket at a second relative rotary position for rotation of the abrasive disk by the drive member; and cooperative shoulders on the two structures, respectively, to releasably engage each other in response to relative rotation of the hub structure from its first position to its second position to prevent withdrawal of the hub structure from the socket.

2. In an apparatus of the character described, means for mounting an abrasive disk on a rotary drive member, comprising:

structure on the drive member having an inner surface defining a noncircular socket extending peripherally around the drive member;

a noncircular hub structure united with the abrasive disk and dimensioned to fit loosely in the noncircular socket at a first rotary position of the hub structure relative to the socket and to bind against the inner surface of the socket at a second relative rotary position for rotation of the abrasive disk by the drive member; and means responsive to relative rotation of the hub structure from its first position to its second position to positively interlock the hub structure with the socket structure to prevent axial separation of the two structures.

3. A combination as set forth in claim 2, in which said interlocking means comprises fixed shoulders on the two structures, respectively, that clear each other at the first rotary position and engage each other at the second rotary position.

4. A combination as set forth in claim 3, in which one of said pair of fixed shoulders is formed by the edge of a noncircular aperture in one of the two structures and the other of said pair of shoulders is formed by a flange of noncircular configuration dimensioned to enter said aperture at the first rotary position of the hub structure.

5. In an apparatus of the character described, means for mounting an abrasive disk on a rotary drive member, comprising:

structure on the drive member and *having an inner surface* forming a noncircular socket and having a boss centrally located in the socket and enveloping the drive member, the boss having a peripheral shoulder facing axially inward of the socket;

a noncircular hub structure united with the abrasive disk and dimensioned to fit loosely in the noncircular socket at a first rotary position of the hub structure relative to the socket and to bind against the inner surface of the socket at a second relative rotary position for rotation of the abrasive disk by the drive member; and shoulder means on the hub structure to engage the peripheral shoulder in response to rotation of the hub structure in the socket from its first position to its second position.

6. In an apparatus of the character described, means for mounting an abrasive disk on a rotary drive member, comprising:

structure on the drive member *and having an inner surface* forming a noncircular socket;

a noncircular hub structure united with the abrasive disk and dimensioned to fit loosely in the socket at a first rotary position of the hub structure relative to the socket and to bind against the inner surface of the socket at a second relative rotary position for rotation of the abrasive disk by the drive member; and yielding means incorporated in the hub structure to interlock with the socket means in a positive manner in yielding response to the binding action between the hub structure and the socket structure to prevent axial separation thereof.

7. A combination as set forth in claim 6, in which the socket is formed with an axial boss and a portion of the hub structure is resiliently yieldable and is shaped and dimensioned to enclose the boss, said boss having axially inwardly facing shoulder means and said portion of the hub structure having an oppositely facing shoulder means, said yieldable portion being biased to urge said opposite shoulder means radially inward into engagement with said inwardly facing shoulder means, said yieldable portion of the hub structure being positioned for confinement against the axial boss by said binding action.

8. In an apparatus of the character described, means for mounting an abrasive disk on a rotary drive member, comprising:

structure forming a socket on the drive member, the socket having at least one inner peripheral recess;

a hub structure united with the abrasive disk to fit into the socket, said hub structure having a radial projection to fit into the recess to prevent relative rotation between the two structures; and cooperating shoulders on the two structures, respectively, positioned radially inwardly away from said recess and said projection, respectively, to releasably engage each other in response to rotation of the hub structure from its first position to its second position, thereby to prevent withdrawal of the hub structure from the socket.

9. In an apparatus of the character described, means for mounting an abrasive disk on a rotary drive member, comprising:

structure forming a socket on the drive member, the socket having at least one inner peripheral recess;

a boss in said socket having a first shoulder facing *axially* [radially] inward of the socket; and a hub structure united with the abrasive disk and dimensioned to fit into said socket around said boss, said hub structure having a yielding portion shaped and dimensioned to project into said inner peripheral recess to abut the surface of the recess with a binding action to cause the abrasive disk to rotate with the drive member, said yielding portion being formed with a second shoulder to engage said first shoulder to prevent withdrawal of the hub structure from the socket, said recess being shaped and dimensioned to cam said yielding portion inward in response to the binding action to lock said second shoulder in engagement with the first shoulder.

10. In an apparatus of the character described, means for mounting an abrasive disk on a rotary drive member, comprising:

structure on said drive member forming a socket having a plurality of radially inward projections;

a boss in said socket having peripheral shoulder means facing axially inward of the socket;

a resilient hub structure united with said disk and shaped with a plurality of radially outward projections, said hub structure being dimensioned to fit into said socket around said boss with its outward projections meshing with the inward projections of the socket, said projections being shaped for cooperative cam action to flex the hub structure radially inward in response to the resistance of the hub structure to rotation by the socket structure; and shoulder means on the hub structure to engage said shoulder means of the boss in response to the radially inward flexure of the hub structure to interlock the two structures against axial separation.

11. A combination as set forth in claim 10, in which said hub structure is divided into a plurality of flexible segments.

12. A combination as set forth in claim 11, in which each of said flexible segments includes one of said outward projections and also a portion of the shoulder means of the hub structure.

13. In an apparatus of the character described, means for mounting an abrasive disk on a rotary drive member, comprising:

a first structure on said drive member forming a socket having at least one radially inward projection, said projection having a first stop surface facing in a first circumferential direction and having a first cam shoulder facing in the second opposite circumferential direction;

a second structure to fit into said socket, said second structure being radially inwardly yieldable and having a radially outward projection to cooperate with said inward projection, said outward projection having a second stop surface facing in the second circumferential direction to abut said first stop surface at a first rotary position of the hub structure relative to the socket structure, said inward projection having a second cam surface facing in the first circumferential direction to cooperate with said first cam surface for rotation of the second structure by the first structure and for cam action to force the second structure to yield radially inwardly in response to the resistance of the second structure to rotation by the socket structure; and shoulder means on the two structures, respectively, to engage each other in response to the radially inwardly yielding action of the hub structure to interlock the two structures against axial separation.

14. A combination as set forth in claim 13, in which said socket is annular with two radially spaced circumferential walls and in which one of said shoulder means is on the inner of the two walls of the socket.

15. In an apparatus of the character described, means for mounting an abrasive disk on a rotary drive member, comprising:

structure on said drive member forming a noncircular socket;

a noncircular hub structure united with said abrasive disk and dimensioned to fit loosely in the socket at a first rotary position of the hub structure relative to the socket and to bind against the inner surface of the socket at a second relative rotary position for rotation of the abrasive disk by the drive member;

means responsive to relative rotation of the hub structure from its first position to its second position to positively interlock the hub structure with the socket structure to prevent axial separation of the two structures; and a magnet on one of said two structures to yieldingly hold the two structures together by magnetic attraction when the hub structure is in the first relative rotary position.

16. A combination as set forth in claim 15, in which the socket is formed by the edge of a noncircular aperture in one of the two structures and the noncircular hub structure is provided with a flange of noncircular configuration dimensioned to enter said aperture at said first rotary position of the hub structure.

[17. In an apparatus of the character described, means for mounting an abrasive disk on a rotary drive member, comprising:

a first structure on the drive member;

a second structure united with the abrasive disk for cooperation with said first structure;

means responsive to mating of the two structures by relative axial movement to yieldingly interengage the two structures with a snap action, thereby to yieldingly resist axial separation of the two structures; and means responsive to relative rotation between the two structures in one rotary direction to interlock the two structures for rotation of the second structure by the first structure in the rotary direction.]

[18. In an apparatus of the character described, means for mounting an abrasive disk on a rotary drive member, comprising:

a first structure on the drive member;

a second structure united with the abrasive disk for cooperation with said first structure;

means responsive to mating of the two structures by relative axial movement to yieldingly interengage the two structures with a snap action, thereby to yieldingly resist axial separation of the two structures; and means responsive to relative rotation between the two structures in one direction to interlock the two structures for rotation of the second structure by the first structure in the one rotary direction and to further interlock the two structures in a positive manner to prevent axial separation of the two structures.]

19. In an apparatus of the character described, means for mounting an abrasive disk on a rotary drive member, comprising:

structure on the drive member having an inner surface which defines a noncircular socket extending peripherally around the drive member;

a noncircular hub structure united with the abrasive disk and dimensioned relative to the noncircular socket to fit loosely in the socket at a first rotary position of the hub structure relative to the socket and to bind against the inner surface of the socket at a second relative rotary position for rotation of the abrasive disk by the drive member; and cooperative disposed shoulders on the two structures, respectively, radially within the noncircular socket to releasably engage each other in response to relative rotation of the hub structure from its first position to its second position to prevent withdrawal of the hub structure from the socket, at least one of said socket and said hub structure being of generally multi-sided to define at least one projection and the other of said socket and hub structure being of a configuration to engage the projection configuration.

20. In an apparatus of the character described, means for mounting an abrasive disk on a rotary drive member, comprising:

structure on the drive member forming a noncircular socket;

a noncircular hub structure united with the abrasive disk and dimensioned to fit loosely in the socket at a first rotary position of the hub structure relative to the socket and to bind against the inner surface of the socket at a second relative rotary position for rotation of the abrasive disk by the drive member; and cooperative shoulders on the two structures, respectively, to releasably engage each other in response to relative rotation of the hub structure from its first position to its second position to prevent withdrawal of the hub structure from the socket, at least one of said socket and said hub structure being of generally oval configuration.

21. In an apparatus [for] *of* the character described, means for mounting an abrasive disk member on a rotary drive member, comprising:

a first structure on said drive member for rotation with the drive member and forming a boss with an axially inwardly facing peripheral shoulder;

a second structure united with the abrasive disk to enclose said boss and releasably engage said peripheral shoulder to resist axial separation of the two structures, the second structure being provided with at least one radial projection; and means on said first structure and positioned radially of said boss and responsive to the rotation of the drive member to engage the radial projection of said second structure and cause the second structure to rotate with the socket structure.

22. In an apparatus of the character described, means for mounting an abrasive disk member on a rotary drive member, comprising:

a first structure on said drive member for rotation with the drive member and forming a circular axial boss having a peripheral inwardly facing shoulder;

a second structure united with the abrasive disk to embrace the boss, said second structure being resilient and being formed with radially inward shoulder means to engage said peripheral shoulder with snap action to resist axial separation of the two structures;

means on said first structure to releasably confine said second structure against said boss to lock said shoulder means in engagement with said peripheral shoulder; and cooperative means on the two structures, respectively, defining a radial projection on one of the structures and means engaging the radial projection on the other structure upon rotation of the drive member for providing a binding relationship to cause said second structure to rotate with the first structure.

[23. In an apparatus of the character described, means for mounting an abrasive disk member on a rotary drive member, comprising:

structure on said drive member forming a socket with two radially spaced circumferential walls, the inner wall of the socket being formed with a peripheral shoulder facing axially inward;

a radially flexible hub structure united with said abrasive disk and dimensioned to enter said socket, said hub structure being formed with radially inward shoulder means and being biased for engagement of said shoulder means with said peripheral shoulder to resist axial separation of the two structures, said hub structure being further provided with at least one projection spaced radially outwardly from the shoulder means;

means on said socket structure to releasably confine said flexible hub structure against said inner wall to lock said shoulder means in engagement with said peripheral shoulder; and cooperative means on the two structures respectively for mutual abutment to cause said hub structure to rotate with the socket structure, said cooperative means including at least one radial projection on one of the structures with the radial projection being disposed radially outwardly from the shoulder means on the hub structure and the releasably confining means on the socket structure, said cooperative means further including means on the other structure for engaging the radial projection upon a rotation of the drive member.]

24. In an apparatus of the character described, means for mounting an abrasive disk member on a rotary drive member, comprising:

a first structure on the drive member forming an axial boss with an inwardly facing peripheral shoulder;

second flexible hub structure united with the abrasive disk to releasably embrace said boss in engagement with said peripheral shoulder to resist axial separation of the two structures, said hub structure being divided into flexible segments separated by radial spaces;

means on said first structure to releasably confine said segments of the hub structure against said boss to lock the segments in engagement with said peripheral shoulder; and means to interlock the two structures against relative rotation to cause the first structure to rotate the abrasive disk.

25. In an apparatus of the character described, means for mounting an abrasive disk member on a rotary drive member *having an inner wall,* comprising:

structure on said drive member forming a socket with two radially spaced circumferential walls, the inner wall of the socket being formed with a peripheral shoulder facing axially inward;

a radially flexible hub structure united with said abrasive disk and dimensioned to enter said socket, said hub structure being formed with radially inward shoulder means and being biased for engagement of said shoulder means with said peripheral shoulder to resist axial separation of the two structures;

means on said socket structure to releasably confine said flexible hub structure against said inner wall to lock said shoulder means in engagement with said peripheral shoulder; and cooperative means on the two structures respectively for mutual abutment to cause said hub structure to rotate with the socket structure, said confining means being retractable axially with the socket structure to release said hub structure.

*26. In combination for use with a rotary drive member having on the drive member structure which forms a socket with at least one inner peripheral recess and with a boss having a first shoulder facing radially inward of the socket:*

*an abrasive disc,*

*a hub structure united with the abrasive disk and dimensioned to fit into the socket around the boss,*

*the hub structure having a yielding portion shaped and dimensioned to project into the inner peripheral recess to abut the surface of the recess with a binding action to cause the abrasive disk to rotate with the drive member,*

*the yielding portion being formed with a radially inwardly extending shoulder to engage the first shoulder to prevent withdrawal of the hub structure from the socket, the yielding portion being shaped and dimensioned relative to the recess to become cammed radially inward in response to the binding action to lock the radially inwardly extending shoulder in engagement with the first shoulder.*

*27. In combination for use with a rotary drive member having on the drive member structure forming a socket with a plurality of radially inward projections and with a boss having peripheral shoulder means facing axially inward of the socket:*

*an abrasive disk;*

*a resilient hub structure united with the disk and shaped with a plurality of radially outward projections, the hub structure being dimensioned to fit into the socket around the boss with its outward projections meshing with the inward projections of the socket, the projections being shaped for cooperative cam action with the radially inward projections of the socket to flex the hub structure radially inward in response to the resistance of the hub structure to rotation by the socket structure; and*

*radially inwardly extending shoulder means on the hub structure to engage the shoulder means of the boss in response to the radially inward flexure of the hub structure to interlock the two structures against axial separation.*

*28. The combination set forth in claim 27 wherein the hub structure is divided into a plurality of flexible segments and wherein each of the flexible segments includes one of the outward projections and also a portion of the shoulder means of the hub structure.*

*29. In an apparatus of the character described, means for mounting an abrasive disk member on a rotary drive member, comprising:*

*structure on said drive member forming a socket with two radially spaced circumferential walls, the inner wall of the socket being formed with a peripheral shoulder facing axially inward;*

*a radially flexible hub structure united with said abrasive disk and dimensioned to enter said socket, said hub structure being formed with radially inward shoulder means and being biased for engagement of said shoulder means with said peripheral shoulder to resist axial separation of the two structures;*

*means on said socket structure to releasably confine said flexible hub structure against said inner wall to lock said shoulder means in engagement with with said peripheral shoulder; and*

*cooperative means on the two structures respectively for mutual abutment to cause said hub structure to rotate with the socket structure, said cooperative means including at least one radial projection on one of the structures with the radial projection on said one of the structures being disposed radially outwardly from the shoulder means on the hub structure and the releasably confining means on the socket structure, said cooperative means further including means on the other structure for engaging the radial projection on said one of the structures upon a rotation of the drive member to obtain a rotation of the hub structure with the drive member.*

*30. In combination for providing an abrasive action;*

*layer means having a first surface with properties of providing an abrasive action, and*

*a hub structure attached to the layer means, the hub structure being made from a resilient material and having a hollow central configuration defined by a plurality of spaced fingers and slots between adjacent fingers to define the spacings between the fingers and provide for a resilience of the fingers, each of the finger having first and second opposite sides, there being a particular distance between diametrically opposite fingers in the plurality, the first sides of the fingers having camming surfaces with a progressively changing distance between such camming surfaces and the corresponding camming surfaces on the diametrically opposite fingers to produce a change in the distance between the camming surfaces on the diametrically opposite fingers in accordance with a force imposed on the camming surfaces of the fingers and in accordance with the resilience of the fingers.*

*31. The combination set forth in claim 30 wherein each of the second sides of the fingers has a configuration defining a substantially constant distance from the second side of the diametrically opposite finger.*

*32. In combination for providing an abrasive action;*

*layer means having a first surface with properties of providing an abrasive action, and*

*a hub structure attached to the layer means and defining an annular configuration, the hub structure being defined by a plurality of fingers separated from one another by slots, the fingers being made from a resilient material and having first and second opposite sides, each of the first sides on the fingers having radially inclined surfaces to provide a camming action for obtaining a displacement of the fingers in accordance with the resiliency of the fingers and in accord-*

*ance with the forces imposed on the camming surfaces of the fingers.*

*33. The combination set forth in claim 32 wherein each of the second sides of the fingers has an equal distance from the second sides of the opposite fingers and each of the second sides of the fingers has a retaining portion of relieved configuration.*

*34. In combination for providing an abrasive action;*

*a first disk having a first surface with properties of providing an abrasive action and having a second surface and having an axis,*

*a second disk constituting a backing member for the first disk, the second disk having first and second surfaces and having an axis, the first surface of the second disk being attached to the second surface of the first disk with a coincidence between the axes of the first and second disks,*

*a hub structure having a first portion of disk-like configuration defined by an axis, the first portion of the hub structure being attached to the first and second disks with a coincidence between the axis of the first portion of the hub structure and the axes of the first and second disks, the first portion of the hub structure being attached to the first and second disks at a position between the second surface of the first disk and the first surface of the second disk,*

*the hub structure having a second portion disposed in substantially perpendicular relationship to the first portion and defined by a plurality of fingers separated from one another by slots defining the fingers, the fingers being made from a resilient material and having first and second opposite sides, the fingers extending in an annular direction, the first sides having first camming surfaces of radially inclined configuration to provide a progressive pivotal displacement of the fingers in accordance with the resilience of the fingers and the imposition of a force on the camming surfaces at progressive positions along the radially inclined configurations of the camming surfaces.*

*35. The combination set forth in claim 36 wherein each of the second surfaces of the fingers has an annular configuration at a particular radius from the axes of the disks and the first portion of the hub structure and each of the surfaces has an annular retaining portion of relieved configuration.*

*36. In combination for providing an abrasive action;*

*disk-like layer means having a surface with properties of providing an abrasive action and having a particuticular axis, and*

*a hub structure made from a resilient material, the hub structure having a first portion attached to the disk-like layer means in flush relationship with the layer means, the hub structure being attached to the layer means on the particular axis of the layer means, the hub structure having a second portion extending integrally from the first portion in substantially perpendicular relationship to the first portion, the second portion being defined by a plurality of spaced fingers extending in an arcuate relationship to the particular axis and separated by slots to define the fingers and to provide for a resiliency of the walls in a radial direction, each of the fingers having first and second opposite sides, each of the first sides having an arcuate configuration relative to the particular axis with a retaining portion of relieved configuration in the arcuate direction, each of the second sides of the fingers having a camming surface of inclined configuration relative to the particular axis.*

*37. The combination set forth in claim 36 wherein the camming surface of each wall progressively increases in radius with progressive displacements in the arcuate direction.*

References Cited

The following references, cited by the Examiner, are of record in the patented file of this patent or the original patent.

UNITED STATES PATENTS

| | | | |
|---|---|---|---|
| 1,811,037 | 6/1931 | Albertson | 51—358 |
| 2,747,343 | 5/1956 | Gellert | 51—377 X |
| 2,991,596 | 7/1961 | Walters | 51—376 |
| 3,046,709 | 7/1962 | Cook | 51—358 X |
| 3,157,010 | 11/1964 | Block | 51—377 |
| 3,226,888 | 1/1966 | Erenyi | 51—362 |

ROBERT C. RIORDON, *Primary Examiner.*

D. G. KELLY, *Assistant Examiner.*